US012775522B2

(12) United States Patent
Bao

(10) Patent No.: US 12,775,522 B2
(45) Date of Patent: Oct. 27, 2026

(54) FAULT PROCESSING METHOD AND COMPUTING DEVICE

(71) Applicant: xFusion Digital Technologies Co., Ltd., Zhengzhou (CN)

(72) Inventor: Quanyang Bao, Zhengzhou (CN)

(73) Assignee: XFUSION DIGITAL TECHNOLOGIES CO., LTD., Zhengzhou (CN)

( * ) Notice: Subject to any disclaimer, the term of this patent is extended or adjusted under 35 U.S.C. 154(b) by 0 days.

(21) Appl. No.: 19/003,670

(22) Filed: Dec. 27, 2024

(65) Prior Publication Data

US 2026/0050512 A1 Feb. 19, 2026

Related U.S. Application Data

(63) Continuation of application No. PCT/CN2023/098429, filed on Jun. 5, 2023.

(30) Foreign Application Priority Data

Jul. 9, 2022 (CN) ......................... 202210803172.7

(51) Int. Cl.
*G06F 11/07* (2006.01)
*G06F 11/10* (2006.01)
(Continued)

(52) U.S. Cl.
CPC .......... *G06F 11/1068* (2013.01); *G06F 11/07* (2013.01); *G06F 11/181* (2013.01); (Continued)

(58) Field of Classification Search
CPC ............... G06F 11/1068; G06F 11/181; G06F 2201/805; G06F 11/08; G06F 11/1028; G06F 11/1024
See application file for complete search history.

(56) References Cited

U.S. PATENT DOCUMENTS 4,335,458 A * 6/1982 Krol .................... G06F 11/1028 714/763
4,888,774 A * 12/1989 Kosuge ................. H03M 13/19 714/E11.046

(Continued)

FOREIGN PATENT DOCUMENTS

CN 105808394 A 7/2016
CN 112650612 A 4/2021

(Continued)

OTHER PUBLICATIONS

Extended European Search Report for the corresponding EP application No. 23838588.4 issued on Aug. 14, 2025.

*Primary Examiner* — Jonathan D Gibson
(74) *Attorney, Agent, or Firm* — WOMBLE BOND DICKINSON (US) LLP

(57) ABSTRACT

This application provides a fault processing method and a computing device. The method is applied to the computing device, and the computing device includes an out-of-band management module and processor firmware. The method includes: The out-of-band management module obtains memory information of a memory; the out-of-band management module determines fault information of the memory based on the memory information, where the fault information includes a fault location, and location precision included in the fault location is located at least at a row address of a fault; the out-of-band management module sends the fault information to the processor firmware; and the processor firmware isolates a memory at the fault location based on the fault information. In the foregoing method, a location that is in the memory and at which the fault occurs can be accurately determined, so that processing precision of the memory fault is improved.

20 Claims, 6 Drawing Sheets

(51) Int. Cl.

*G06F 11/18* (2006.01)
*G06F 11/08* (2006.01)

(52) U.S. Cl.

CPC .......... *G06F 11/08* (2013.01); *G06F 11/1016* (2013.01); *G06F 11/1024* (2013.01); *G06F 11/1028* (2013.01); *G06F 2201/805* (2013.01)

(56) References Cited

U.S. PATENT DOCUMENTS

| | | | | |
|---|---|---|---|---|
| 6,453,440 | B1 * | 9/2002 | Cypher | G06F 11/1024 714/E11.046 |
| 8,181,100 | B1 * | 5/2012 | Purdham | G11C 29/02 714/819 |
| 10,261,852 | B2 * | 4/2019 | Benedict | G06F 11/0787 |
| 10,489,232 | B1 | 11/2019 | Beserra et al. | |
| 11,269,723 | B2 * | 3/2022 | Cha | G06F 11/0772 |
| 12,142,335 | B2 * | 11/2024 | Buch | G11C 29/74 |
| 2001/0010084 | A1 * | 7/2001 | Lin | G06F 11/1012 714/E11.042 |
| 2009/0276659 | A1 * | 11/2009 | Suzuki | G11C 29/025 714/15 |
| 2014/0157044 | A1 * | 6/2014 | Dell | G06F 11/0793 714/6.11 |
| 2015/0261632 | A1 * | 9/2015 | Kim | G11C 29/4401 714/6.11 |
| 2016/0239379 | A1 * | 8/2016 | Fee | G06F 11/0727 |
| 2020/0133758 | A1 | 4/2020 | Liu et al. | |
| 2022/0076774 | A1 | 3/2022 | Yang et al. | |
| 2022/0129350 | A1 * | 4/2022 | Sharma | G06F 3/0619 |
| 2022/0350715 | A1 * | 11/2022 | Zhou | G11C 29/16 |
| 2025/0013526 | A1 * | 1/2025 | Zhang | G06F 11/079 |
| 2025/0045176 | A1 * | 2/2025 | Li | G06F 12/0802 |
| 2025/0087290 | A1 * | 3/2025 | Zhang | G11C 29/44 |
| 2026/0050512 | A1 * | 2/2026 | Bao | G06F 11/073 |

FOREIGN PATENT DOCUMENTS

| | | | |
|---|---|---|---|
| CN | 114064333 | A | 2/2022 |
| CN | 114968652 | A | 8/2022 |
| CN | 115080331 | A | 9/2022 |
| JP | 2015041175 | A | 3/2015 |
| WO | 2019218110 | A1 | 11/2019 |

* cited by examiner

FAULT PROCESSING METHOD AND COMPUTING DEVICE

CROSS-REFERENCE TO RELATED APPLICATIONS

This application is a continuation of International Application No. PCT/CN2023/098429, filed on Jun. 5, 2023, which claims priority to Chinese Patent Application No. 202210803172.7, filed on Jul. 9, 2022, both of which are hereby incorporated by reference in their entireties.

TECHNICAL FIELD

This application relates to the field of computer technologies, and in particular, to a fault processing method and a computing device.

BACKGROUND

As a capacity of a memory in a computer system becomes increasingly large, a probability that a fault occurs in the memory becomes increasingly high.

Currently, a baseboard management controller (BMC) may predict a memory fault based on error information existing when the memory fault occurs, so that a processing module in the computer system processes the memory fault. However, when the BMC predicts the memory fault, a location of the memory fault can only be accurate to a bank address. When a row fault or a bit fault occurs in a memory, the BMC cannot determine a more refined fault address. Consequently, the processing module cannot accurately locate a location of the fault when processing the memory fault, and processing precision of the memory fault is low.

Therefore, how to predict the memory fault and accurately locate the location of the fault becomes an urgent problem to be resolved.

SUMMARY

This application provides a fault processing method and a computing device, to predict a memory fault and accurately locate a location of the fault, so that processing precision of the memory fault is improved.

According to a first aspect, an embodiment of this application provides a fault processing method, applied to a computing device, where the computing device includes an out-of-band management module and processor firmware, and the method includes:

- the out-of-band management module obtains memory information of a memory;
- the out-of-band management module determines fault information of the memory based on the memory information, where the fault information includes a fault location, and location precision included in the fault location is located at least at a row address of a fault;
- the out-of-band management module sends the fault information to the processor firmware; and
- the processor firmware isolates a memory at the fault location based on the fault information.

In the foregoing method, the computing device may determine the memory fault based on the memory information, and may locate a location of the memory fault at least at a row address of the fault, so that processing precision of the memory fault is improved.

In an embodiment, that the processor firmware isolates a memory at the fault location based on the fault information includes:

- when the location precision of the fault location is located at the row address of the fault, the processor firmware determines a target row based on the fault location, and isolates a memory in the target row; and
- when the location precision of the fault location is located at a bit address of the fault, the processor firmware determines a target bit based on the fault location, and isolates a memory on the target bit.

In the foregoing method, a target row/target bit on which the fault occurs may be determined based on the fault location, so that the computing device can isolate the target row/target bit.

In an embodiment, the fault information further includes a fault type, and that the out-of-band management module sends the fault information to the processor firmware includes:

- when the fault type is a row fault, the out-of-band management module sends the fault location and a row isolation self-healing request to the processor firmware, where the row isolation self-healing request is used to instruct the processor firmware to isolate a memory corresponding to a faulty row; and
- that the processor firmware isolates a memory at the fault location based on the fault information includes:
- the processor firmware isolates the memory at the fault location based on the row isolation self-healing request.

In the foregoing method, when the fault type is a row fault, the processor firmware isolates, based on the row isolation self-healing request, the target row in which the fault occurs, so that processing precision of the memory fault is relatively high.

In an embodiment, the fault information further includes a fault type, and that the out-of-band management module sends the fault information to the processor firmware includes:

- when the fault type is a bit fault, the out-of-band management module sends the fault location and a bit isolation self-healing request to the processor firmware, where the bit isolation self-healing request is used to instruct the processor firmware to isolate a memory corresponding to a faulty bit; and
- that the processor firmware isolates a memory at the fault location based on the fault information includes:
- the processor firmware isolates the memory at the fault location based on the bit isolation self-healing request.

In the foregoing method, when the fault type is a bit fault, the processor firmware isolates, based on the bit isolation self-healing request, the target bit on which the fault occurs, so that processing precision of the memory fault is relatively high.

In an embodiment, the fault location includes a processor address, a channel address, a memory address, a rank (rank) address, a particle (device) address, a bank (bank) address, a row address, a column address, and error checking and correction ECC register information.

In the foregoing method, the fault location may include a processor address, a channel address, a memory address, a rank address, a particle address, a bank address, a row address, a column address, an ECC register address, and the like of an area of the memory fault, so that the computing device can accurately locate a faulty area.

In an embodiment, that the processor firmware determines a target row based on the fault location includes:

the processor firmware determines a target bank based on the processor address, the channel address, the memory address, the rank address, the particle address, and the bank address in the fault location; and the processor firmware determines, as the target row, a row that is in the target bank and that is corresponding to the row address.

In the foregoing method, when the memory fault type is a row fault, the computing device may locate the target row based on the fault location, so that fault processing precision is relatively high.

In an embodiment, that the processor firmware determines a target bit based on the fault location includes:

the processor firmware determines a target bank based on the processor address, the channel address, the memory address, the rank address, the particle address, and the bank address in the fault location;

the processor firmware determines a candidate storage cell from the target bank based on the row address and the column address; and the processor firmware determines the target bit from the candidate storage cell based on the ECC register information.

In the foregoing method, when the memory fault type is a bit fault, the computing device may locate the target bit based on the fault location, so that fault processing precision is relatively high.

In an embodiment, the memory information includes at least one of the following:

error information of the memory;

running status information of the memory; and device running information of a device on which the memory is located.

In the foregoing method, the computing device may obtain at least one of the error information of the memory, the running status information of the memory, and the device running information of the device on which the memory is located, so that the computing device can determine the memory fault based on the obtained information.

In an embodiment, that the out-of-band management module determines fault information of the memory based on the memory information includes:

the out-of-band management module processes the memory information by using a machine learning algorithm, to obtain the fault information.

In the foregoing method, the fault information may be determined by using the machine learning algorithm, so that the computing device can determine the memory fault.

According to a second aspect, an embodiment of this application provides a computing device, including one or more processors and one or more memories. The one or more memories are configured to store computer program code, the computer program code includes computer instructions, and the one or more processors execute the computer instructions, so that the one or more processors perform the method according to any embodiment of the first aspect.

In the foregoing computing device, the processor may perform the fault processing method according to any embodiment of the first aspect, so that processing precision of the memory fault is relatively high.

BRIEF DESCRIPTION OF DRAWINGS

To describe the technical solutions in embodiments of this application or a conventional technology more clearly, the following briefly describes the accompanying drawings required for describing the embodiments or the conventional technology. Clearly, the accompanying drawings in the following description show merely some embodiments of this application, and a person of ordinary skill in the art may still derive other drawings from these accompanying drawings without creative efforts.

DESCRIPTION OF EMBODIMENTS

Example embodiments are described herein in detail, and the examples are shown in the accompanying drawings. When the following descriptions relate to the accompanying drawings, unless otherwise indicated, same numbers in different accompanying drawings represent same or similar elements. Implementations described in the following example embodiments do not represent all implementations consistent with this application. On the contrary, they are merely examples of apparatuses and methods that are consistent with some aspects of this application as detailed in the appended claims.

It should be noted that in this specification, the term "include", "contain", or any other variant is intended to cover non-exclusive inclusion, so that a process, a method, an article, or an apparatus that includes a series of elements is not necessarily limited to these elements, but further includes other elements that are not clearly listed or further includes elements that are inherent to the process, the method, the article, or the apparatus. In the absence of more restrictions, an element defined by the statement "including a . . . " does not rule out another same element in a process, a method, an article, or an apparatus that includes the element.

Figure 1:
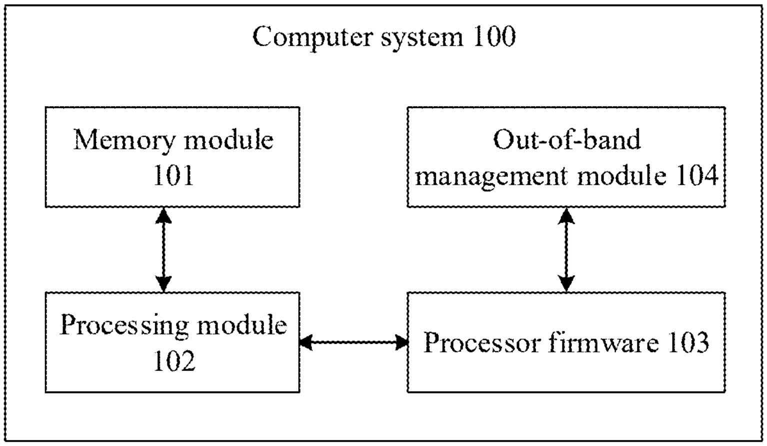
FIG. 1 is a schematic diagram of an architecture of a computer system according to an embodiment of this application.

For ease of understanding, an architecture of a computer system in embodiments of this application is described first with reference to FIG. 1.

FIG. 1 is a schematic diagram of an architecture of a computer system according to an embodiment of this application. As shown in FIG. 1, the computer system 100 includes a memory module 101, a processing module 102, processor firmware 103, and an out-of-band management module 104.

A specific type of the computer system 100 is not limited in this embodiment of this application. The computer system 100 may be any device including a structure similar to that in FIG. 1. The computer system 100 may include more or fewer components than those shown in the figure, combine some components, split some components, or have different component arrangements. The components shown in the figure may be implemented by hardware, software, or a combination of software and hardware. For example, the computer system 100 may be a server, a server cluster, a laptop computer, a desktop computer, a tablet computer, a mobile phone, an artificial intelligence device, or the like.

The memory module 101 includes one or more memories. The memory is also referred to as an internal memory or a primary memory, and is mounted in a memory slot on a mainboard of a computer device. The memory may be configured to store operation data of a processor. For example, the memory may be a dual inline memory module (DIMM), a dynamic random access memory (DRAM), a random access memory (RAM), or a read-only memory (ROM).

The processing module 102 includes one or more processors. The processor includes a memory controller. The memory communicates with the memory controller by using a memory channel.

The processor firmware 103 is also referred to as a processor firmware program. The processor firmware 103 may be a firmware program such as a basic input/output system (BIOS), a unified extensible firmware interface (UEFI), a management engine (ME), an intelligent management unit (IMU), or microcode. It should be noted that a specific form of the processor firmware 103 is not limited in this embodiment of this application, and the foregoing is merely an example description. In the following embodiment, only a BIOS is used as an example of the processor firmware 103 for description. The processor firmware 103 may collect error information existing when the memory is faulty. For example, the error information may be correctable error information and uncorrectable error information.

The out-of-band management module 104 may be a management module of a non-service module in the computer system 100. The out-of-band management module 104 communicates with the processor firmware 103 by using a dedicated interface. The out-of-band management module 104 may maintain and manage the computer system 100. For example, the out-of-band management module 104 may be a baseboard management controller (BMC) outside a computer or a server device, a monitoring and management unit outside the computer or the server device, a management system in a management chip outside the processor, a system management module (SMM) of the server device, or the like. It should be noted that a specific form of the out-of-band management module is not limited in this embodiment of this application, and the foregoing is merely an example description. In the following embodiment, a BMC is merely used as an example of the out-of-band management module 104 for description.

In the computer system, the processor firmware 103 may collect memory information existing when a memory fault occurs, and may send the memory information to the out-of-band management module 104. The out-of-band management module 104 may determine fault information of the memory based on the memory information sent by the processor firmware 103, and send the fault information to the processor firmware 103. The processor firmware 103 may repair the memory fault based on the fault information.

For ease of understanding, a correspondence between a processor and a memory is described below with reference to FIG. 2.

Figure 2:
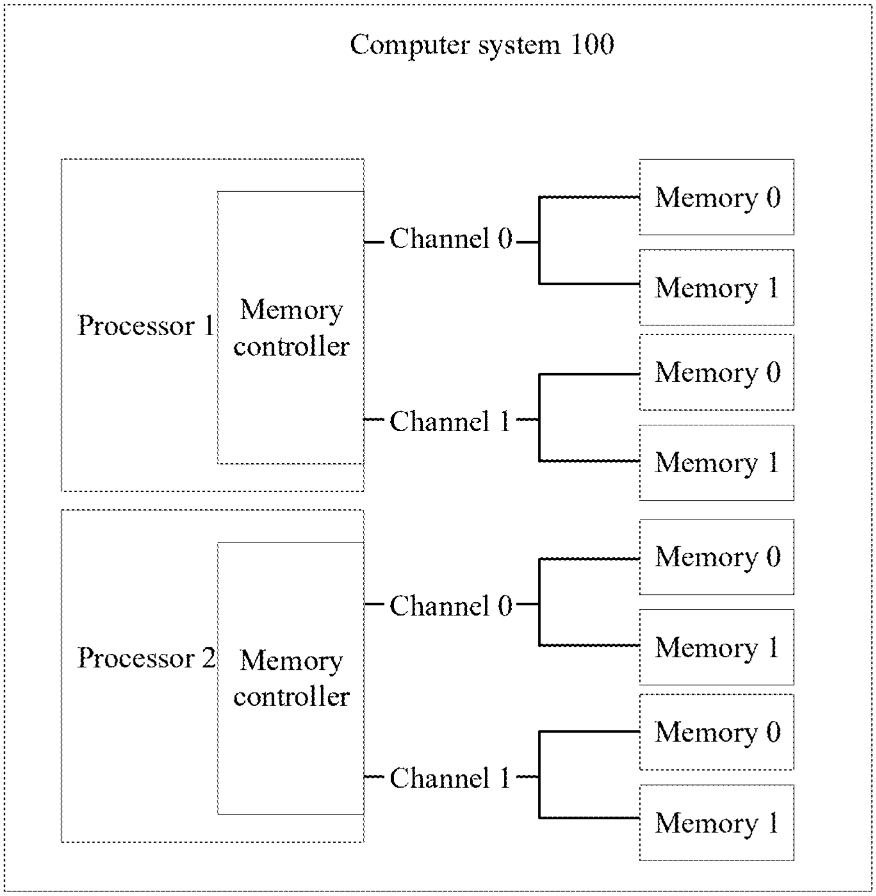
FIG. 2 is a schematic diagram of a correspondence between a processor and a memory according to an embodiment of this application.

FIG. 2 is a schematic diagram of a correspondence between a processor and a memory according to an embodiment of this application. As shown in FIG. 2, a computer system including two processors is used as an example. A computer system 100 includes processors, and the processor includes a memory controller. For example, the processors may be a processor 1 and a processor 2.

The processor 1 may have two channels: a channel 0 and a channel 1. Two memories: a memory 0 and a memory 1 may be inserted into the channel 0. Two memories: a memory 0 and a memory 1 may also be inserted into the channel 1.

The processor 2 may have two channels: a channel 0 and a channel 1. Two memories: a memory 0 and a memory 1 may be inserted into the channel 0. Two memories: a memory 0 and a memory 1 may also be inserted into the channel 1.

In the computer system 100, to search for a memory, a processor number, a channel number, and a memory number that are corresponding to the memory need to be obtained. For example, it is assumed that a processor number of a specific memory in the computer system 100 is 2, a channel number is 0, and a memory number is 1, it may be determined that the memory is the memory 1 inserted into the channel 0 of the processor 2 in the computer system 100.

Further, the memory has at least one rank (rank), each rank is located on one surface of the memory, and each rank includes at least one subrank (subrank). The rank or the subrank includes a plurality of memory particles (device). Each memory particle is divided into a plurality of bank groups (bank group), and each bank group includes a plurality of banks (bank). Each bank is divided into a plurality of storage cells (cell). Each storage cell has one row (row) address and one column (column) address. Each storage cell includes one or more bits. In a division manner, the memory may be successively divided from a higher level to a lower level into a memory particle, a bank group, a bank, a storage row/storage column, a storage cell, and a bit (bit). Addresses of the memory particle, the bank group, the bank, the row, the column, the storage cell, and the bit on the memory are real physical addresses. If a storage area with a smaller granularity in the memory is to be searched for, a more detailed physical address is required.

A more detailed physical address in the memory is described below with reference to FIG. 3 by using a specific example.

Figure 3:
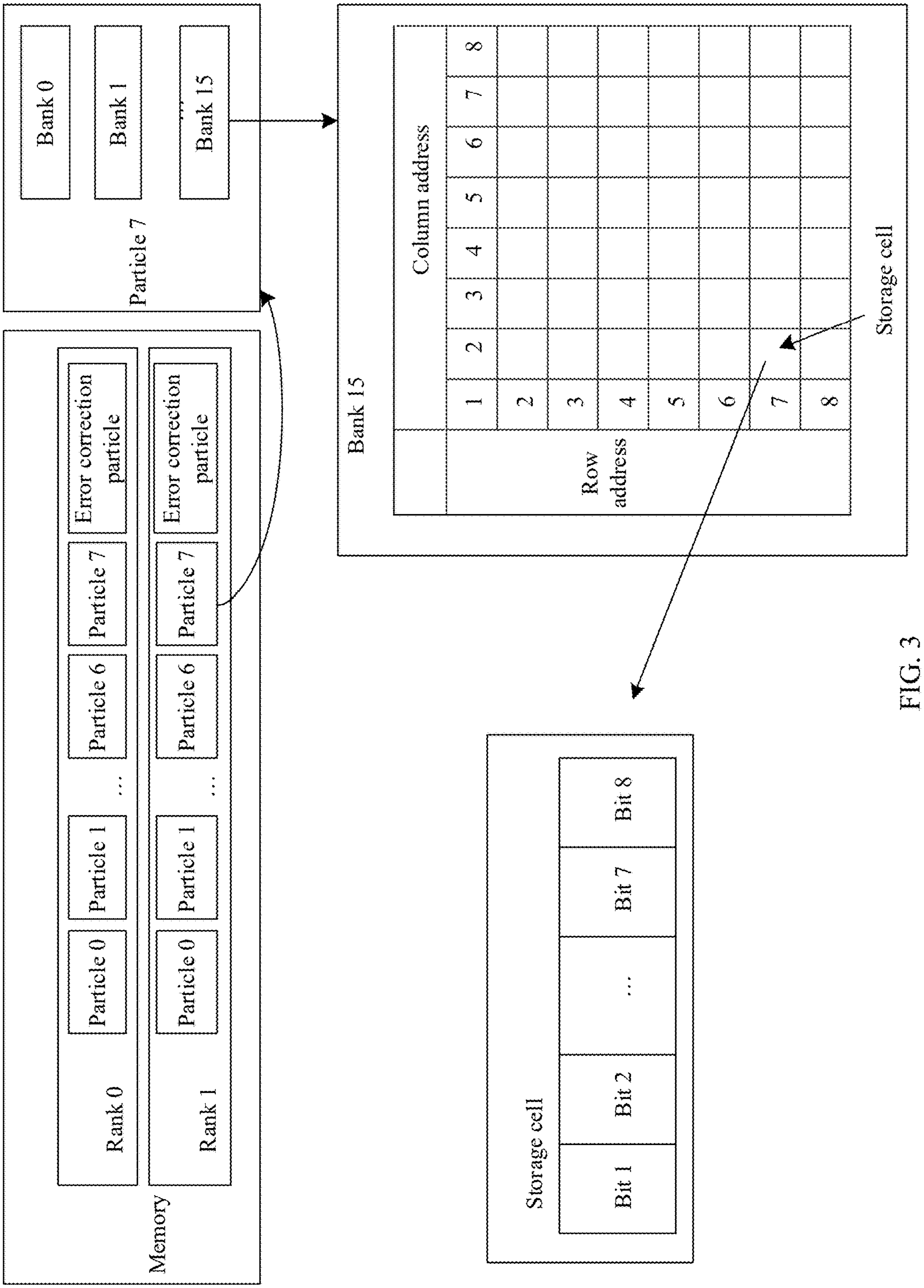
FIG. 3 is a schematic diagram of a structure of a memory according to an embodiment of this application.

FIG. 3 is a schematic diagram of a structure of a memory according to an embodiment of this application. As shown in FIG. 3, the memory includes two ranks. The ranks may be a rank 0 and a rank 1. A plurality of particles may be configured for each rank. For example, the particles may be a particle 0, a particle 1, a particle 2, . . . , a particle 7, and an error correction particle.

Any one of the foregoing memory particles may be divided into a plurality of banks. As shown in FIG. 3, a particle 7 in the rank 1 is used as an example. The particle 7 may include a bank 0, a bank 1, . . . , a bank 14, and a bank 15. In addition, a plurality of banks may be further classified into one bank group. A quantity of banks in each bank group may be the same, or may be different.

Any one of the foregoing banks includes a plurality of storage cells. The plurality of storage cells may be arranged in a form of a two-dimensional matrix. As shown in FIG. 3, a bank 14 of the particle 7 in the rank 1 is used as an example. The bank 14 includes a plurality of storage cells, and one storage cell in the bank may be uniquely determined by using a row address and a column address.

Any storage cell includes a plurality of bits. As shown in FIG. 3, in the bank 14, one storage cell may be uniquely determined based on a row address 7 and a column address 2. The storage cell may include a bit 1, a bit 2, . . . , a bit 7, and a bit 8. The bit is a storage unit with a minimum granularity in the memory.

In the foregoing memory structure, a target storage cell may be accurately located by using a memory number, a rank number, a particle number, a bank number, a row address, and a column address. A target row may also be accurately located by using a memory number, a rank number, a particle number, a bank number, and a row address.

A memory fault prediction and processing method is shown as an example below with reference to FIG. 4.

Figure 4:
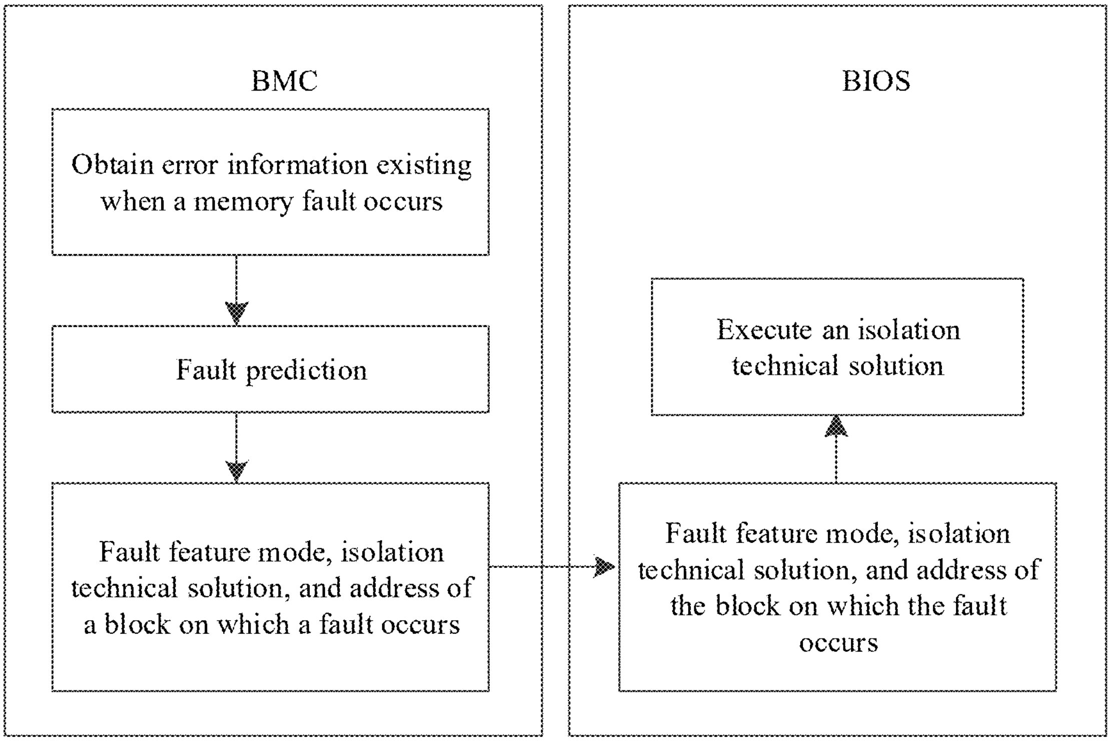
FIG. 4 is a schematic diagram of memory fault prediction and processing.

FIG. 4 is a schematic diagram of memory fault prediction and processing. As shown in FIG. 4, a BMC may obtain error information existing when a memory fault occurs, and perform fault prediction based on the obtained error information. Through fault prediction, the BMC may determine a fault feature mode, isolation technical solutions corresponding to different fault feature modes, and an address of a block on which a fault occurs. The fault feature mode may include a bit fault and a row fault. The BMC may further send the fault feature mode, the isolation technical solution, and the address of the block on which the fault occurs to a BIOS. The BIOS can execute the isolation technical solution sent by the BMC, to process the memory fault. In the foregoing method, regardless of the row fault or the bit fault, the BMC can determine only an address of a bank on which the fault occurs, and cannot determine a specific row location or bit location of the fault.

Figure 5:
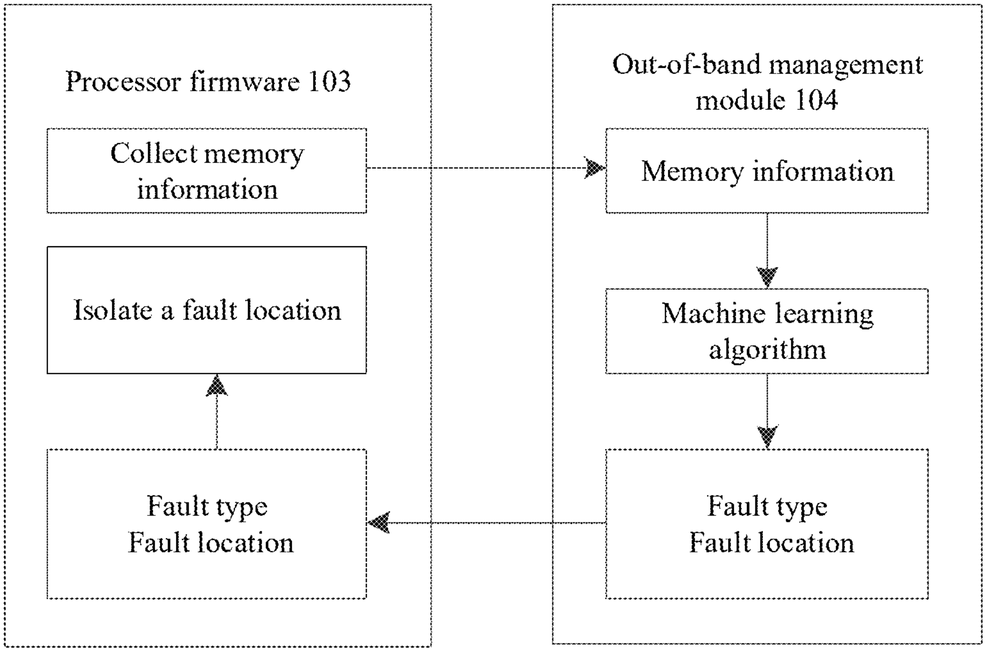
FIG. 5 is a schematic diagram of a memory fault prediction and processing method according to an embodiment of this application.

Embodiments of this application provide a memory fault prediction and processing method, to accurately locate a location of a fault and improve processing precision of the memory fault. FIG. 5 is a schematic diagram of a memory fault prediction and processing method according to an embodiment of this application.

As shown in FIG. 5, processor firmware 103 may collect memory information. The memory information may include memory error information, memory running status information, and the like. An out-of-band management module 104 may obtain the memory information from the processor firmware 103, and process the memory information by using a machine learning algorithm, to obtain fault information. The fault information may include a fault type and a fault location. Location precision of the fault location can be located at least at a row address of a fault. The out-of-band management module 104 may further send the fault type and the fault location to the processor firmware 103, so that the processor firmware 103 can accurately isolate the fault location, thereby improving processing precision of the memory fault.

The technical solutions in this application are described in detail below by using specific embodiments. The following several specific embodiments may be combined with each other. A same or similar concept or process may not be described again in some embodiments.

Figure 6:
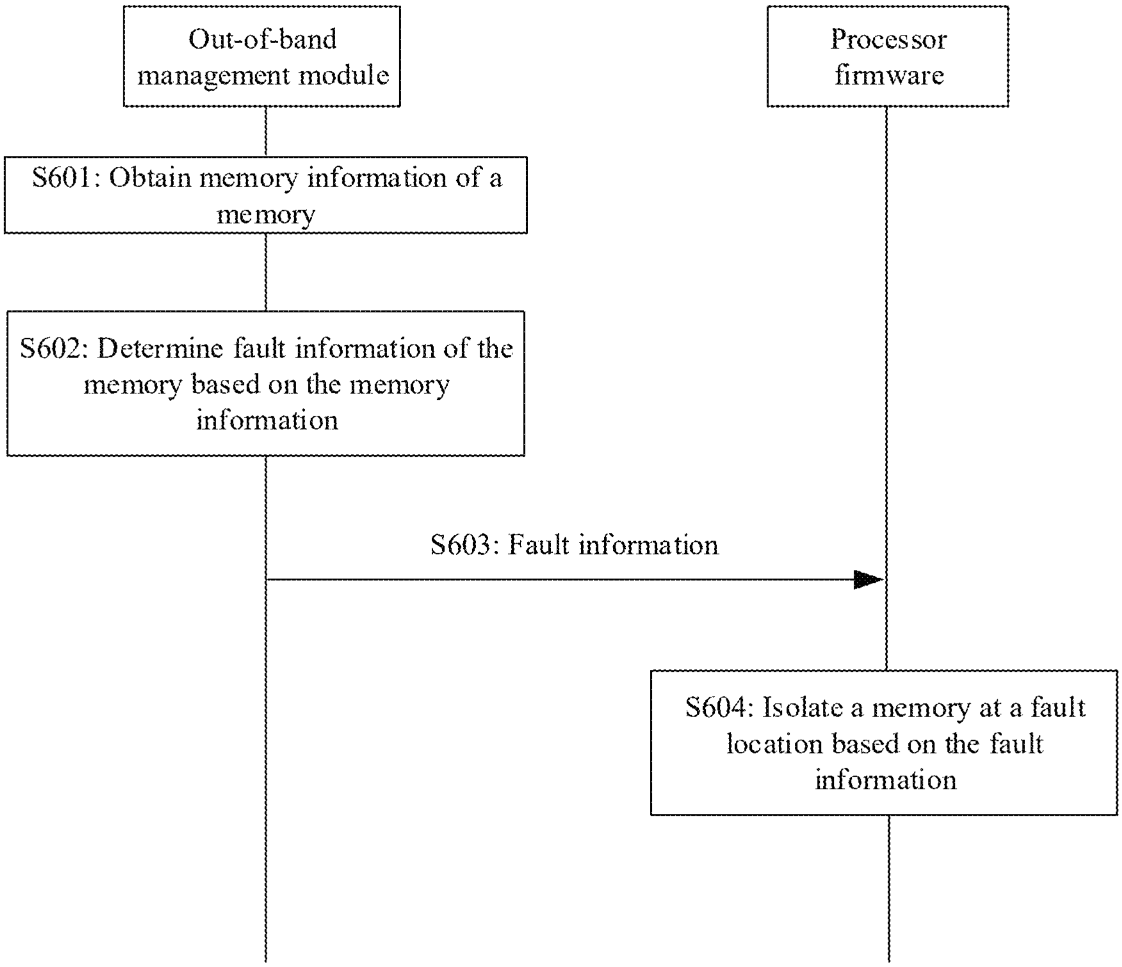
FIG. 6 is a schematic flowchart of a memory fault prediction and processing method according to an embodiment of this application.

FIG. 6 is a schematic flowchart of a memory fault prediction and processing method according to an embodiment of this application. As shown in FIG. 6, the method may include the following operations.

Operation S601: An out-of-band management module obtains memory information of a memory.

The memory information includes at least one of the following: error information of the memory, running status information of the memory, and device running information of a device on which the memory is located.

The error information of the memory includes at least one of the following: correctable error (CE) information, uncorrectable error (UCE) information, ECC error correction register information, machine-check architecture (MCA) register information, MCA report information, and mode register (MR) information that are obtained after an error is corrected by using an error checking and correction (ECC) technology. The error information of the memory may include current error information of the memory and historical error information of the memory.

A computer system supports the ECC technology and can check and correct an error in a running process of the memory by using the ECC technology.

The CE information may include at least one of a category of a CE, a quantity of CE errors, occurrence time of the CE, a physical address of the CE, system address information of the CE, a quantity of memory patrol CE errors, a row address of the memory patrol CE error, and an address of a row with a maximum quantity of memory patrol CE errors.

The UCE information may include at least one of a quantity of UCE errors, occurrence time of the UCE, a physical address of the UCE, a status of the UCE, a quantity of memory patrol UCE errors, and a row address of the memory patrol UCE errors.

The running status information of the memory includes at least one of the following: a capacity of a memory module, a read/write rate of the memory module, memory temperature information, running program information, and memory health status information.

The device running information of the device on which the memory is located includes at least one of the following: a running status of the device, manufacturer information of a processor, a category of the processor, a model of the processor, a dominant frequency of the processor, a process generation of the processor, occupation rate information of the processor, temperature information of the processor, a category of the memory, manufacturer information of the memory, a dominant frequency of the memory, a sequence number of the memory, a minimum voltage of the memory, a quantity of ranks of the memory, and a bit width of the memory.

It should be noted that the device on which the memory is located may include one or more memories. The memory information is memory information corresponding to all memories in the device. For example, when the device on which the memory is located includes one memory, the memory information may include error information of the memory, running status information of the memory, and device running information of the device on which the memory is located; and when the device on which the memory is located includes a plurality of memories, the memory information includes error information of the plurality of memories, running status information of the plurality of memories, and device running information of the device on which the memory is located.

The out-of-band management module may obtain the memory information from processor firmware. For example, the processor firmware may be a BIOS.

In an embodiment, before the out-of-band management module obtains the memory information from the processor firmware, the processor firmware may collect the memory information.

For example, the processor firmware may collect information about a quantity of CEs that occur in a running process of the memory, occurrence time of the CE, a physical address at which the CE occurs, information about a quantity of UCEs, occurrence time of the UCE, a physical address at which the UCE occurs, and the like. The processor firmware may further collect information such as a capacity of each memory module, a read/write rate of each memory module, and temperature of each memory module.

Operation S602: The out-of-band management module determines fault information of the memory based on the memory information.

In an embodiment, the fault information includes a fault location, and location precision included in the fault location is located at least at a row address of the fault.

The fault location may include a processor address, a channel address, a memory address, a rank address, a particle address, a bank address, a row address, a column address, and ECC register information.

The processor address may be a processor number, the channel address may be a channel number, the memory address may be a memory number, the rank address may be a rank number, the particle address may be a particle number, the bank address may be a bank number, the row address may be a row number, and the column address may be a column number.

The ECC register information may be fault code generated by an ECC register for each bit in the memory, and the fault code may be "0" or "1". For example, for any bit, if fault code of the bit is "1", it indicates that the bit is faulty; and if the fault code of the bit is "0", it indicates that there is no memory fault on the bit.

Location precision of the fault location may be represented by an address corresponding to a minimum memory area at the fault location. For example, it is assumed that an address corresponding to a minimum memory area in a plurality of addresses included in the fault address is a row address, and in this case, location precision of the fault location is located on a row in which the fault is located; and it is assumed that an address corresponding to a minimum memory area in a plurality of addresses included in the fault address is a bit address, and in this case, location precision of the fault location is located on a bit on which the fault is located.

In another possible implementation, the fault information further includes a fault type.

The fault type includes a bit fault and a row fault.

The bit fault is a fault that occurs on a specific bit in the memory. When the bit fault occurs, the bit needs to be repaired.

The row fault is a fault that occurs in a specific row in the memory. When the row fault occurs, the row needs to be repaired.

In this embodiment of this application, the out-of-band management module may process the memory information by using a machine learning algorithm to obtain the fault information. The machine learning algorithm includes but is not limited to a fault prediction model established based on the memory information, a deep learning algorithm based on the memory information, and a federated learning optimization-class algorithm based on the memory information.

When the machine learning algorithm is a fault prediction model established based on the memory information, the out-of-band management module may obtain memory information of all memories in the device in a period of time, and establish a fault prediction model based on the obtained memory information. When determining the fault information of the memory, the out-of-band management module may process the currently obtained memory information by using the fault prediction model, to obtain the fault information. In an embodiment, the out-of-band management module may also update the fault prediction model based on the currently obtained memory information, to improve calculation precision of the fault prediction model.

When the machine learning algorithm is a deep learning algorithm based on the memory information and a federated learning optimization-class algorithm based on the memory information, the out-of-band management module may obtain memory information of all memories in the device within a period of time, calculate the obtained memory information by using the foregoing algorithm, determine, based on a calculation result, a memory area that is most prone to a fault, and determine a memory address corresponding to the memory area as a fault location.

For example, fault prediction models established based on the memory information include but are not limited to a hierarchical threshold algorithm, a random forest model, a gradient boosting decision tree (GBDT) model, an extreme gradient boosting (XGBoost) model, a naive Bayesian model, and a support vector machine (SVM) model.

Deep learning algorithms based on the memory information include but are not limited to a convolutional neural network (CNN) algorithm and a long short-term memory (LSTM).

Federated learning optimization-class algorithms include but are not limited to federated averaging (FedAvg), federated optimization with proximal term (FedProx), and client selection for federated learning (FedCS).

It should be understood that an input parameter of the machine learning algorithm may be the memory information, and an output parameter may be the fault type and the fault location.

Operation S603: The out-of-band management module sends the fault information to the processor firmware, where the fault information is used by the processor firmware to isolate a memory at the fault location.

In an embodiment, the fault information includes the fault location.

In this case, the out-of-band management module sends the fault location to the processor firmware. The processor firmware may isolate, based on the fault location, a memory on which a fault occurs.

In another possible implementation, the fault information includes the fault location and the fault type.

In this case, when the fault type is a row fault, the out-of-band management module sends the fault location and a row isolation self-healing request to the processor firmware, and the row isolation self-healing request is used to instruct the processor firmware to isolate a memory corresponding to a faulty row. When the fault type is a bit fault, the out-of-band management module sends the fault location and a bit isolation self-healing request to the processor firmware, and the bit isolation self-healing request is used to instruct the processor firmware to isolate a memory corresponding to a faulty bit.

In an actual implementation process, a definition field may be used to replace specific fault information. In other words, the out-of-band management module may directly send a definition field of the fault type and a definition field of the fault location to the processor firmware.

For example, the definition field of the fault type may be shown in Table 1.

TABLE 1

| Fault type | Definition field |
|---|---|
| No information about a to-be-isolated fault | 0 |
| Bit fault | 1 |
| Row fault | 6 |
| Column fault | 2 |
| Bank fault | 3 |
| Particle fault | 4 |
| Rank fault | 5 |
| Reserved | Another value |

The definition field of the fault location is a number of each address. For example, the definition field of the fault location may be shown in Table 2.

TABLE 2

| Fault location | Definition field |
|---|---|
| Processor address | Processor number |
| Channel address | Channel number |
| Memory address | Memory number |
| Rank address | Rank number |
| Particle address | Particle number |
| Row address | Row number |
| Column address | Column number |

For example, a definition field of the isolation self-healing request may be shown in Table 3.

TABLE 3

| Isolation self-healing request | Definition field |
|---|---|
| Bit isolation self-healing request | 0 |
| Row isolation self-healing request | 1 |

Operation S604: The processor firmware isolates a memory at the fault location based on the fault information.

Before the memory at the fault location is isolated, the processor firmware may determine, based on the fault information, a row in which the fault is located, that is, a target row, or the processor firmware may determine, based on the fault information, a bit on which the fault is located, that is, a target bit.

The fault information may include the fault location, or the fault information may include the fault location and the fault type. For different content included in the fault information, that the processor firmware determines the target row/target bit includes at least the following two cases:

Case 1: The fault information includes the fault location.

In an embodiment, when the location precision of the fault location is located at the row address of the fault location, the target row is determined based on the fault location, and a memory in the target row is isolated; and when the location precision of the fault location is located at the bit address of the fault location, the target bit is determined based on the fault location, and a memory on the target bit is isolated.

In this case, the processor firmware can isolate the memory at the fault location based on the fault location, so that overheads used by the out-of-band management module to determine the fault information are relatively small.

In another possible implementation, the processor firmware may isolate, based on the fault location and the memory information, a row in which the fault is located or a bit on which the fault is located. For example, the processor firmware may isolate the memory at the fault location based on the fault location and at least one of error information of the memory, running status information of the memory, and device running information of a device on which the memory is located.

Case 2: The fault information includes the fault location and the fault type.

When the fault type is a row fault, a target row is determined based on the fault location, and a memory in the target row is isolated based on a row isolation self-healing request. When the fault type is a bit fault, a target bit is determined based on the fault location, and a memory on the target bit is isolated based on a bit isolation self-healing request.

In this case, the processor firmware does not need to determine the fault type, so that the processor firmware has a relatively fast isolation speed.

For the row fault and the bit fault, that the processor firmware isolates the memory at the fault location includes the following two cases:

Case 1: Row fault.

A target bank is determined based on a processor address, a channel address, a memory address, a rank address, a particle address, and a bank address in the fault location, and a row that is in the target bank and that is corresponding to the row address is determined as a target row.

The target bank is a bank in which the target row is located.

Specifically, in descending order of address ranges, the processor firmware may successively determine a processor corresponding to the target row by the processor address, determine a channel corresponding to the target row from the determined processor based on the channel address, determine, from the determined channel based on the memory address, a memory in which the target row is located, determine, from the determined memory based on the rank address, a rank in which the target row is located, determine, from the determined rank based on the particle address, a particle in which the target row is located, determine a target bank from the determined particle based on the bank address, and determine the target row from the target bank based on the row address.

After the target row is determined, the processor firmware may isolate the target row.

Case 2: Bit fault.

A target bank is determined based on a processor address, a channel address, a memory address, a rank address, a particle address, and a bank address in the fault location; a candidate storage cell is determined from the target bank based on the row address and the column address; and a target bit is determined from the candidate storage cell based on ECC register information.

The candidate storage cell is a storage cell in which the target bit is located.

Specifically, in descending order of address ranges, the processor firmware may successively determine a processor corresponding to the target row by using the processor address, determine a channel corresponding to the target row from the determined processor based on the channel address, determine, from the determined channel based on the memory address, a memory in which the target row is located, determine, from the determined memory based on the rank address, a rank in which the target row is located, determine, from the determined rank based on the particle address, a particle in which the target row is located, determine a target bank from the determined particle based on the bank address, and determine the candidate storage cell from the target bank based on the row address and the column address, and may determine the target bit from the candidate storage cell based on the ECC register information.

For example, it is assumed that fault code generated by an ECC register for a normal bit is "0", and fault code generated for a faulty bit is "1". If the candidate storage cell includes 8 bits, fault code generated by the ECC register for the 8 bits is successively 00010000. In this case, the processor firmware may determine that the target bit is a fourth bit in the candidate storage cell.

In the fault processing method provided in this embodiment, the processor firmware may collect the memory information. The out-of-band management module may obtain the memory information from the processor firmware, and determine the fault type and the fault location by using the machine learning algorithm. The fault location can be accurate to a row address or a bit address of the fault. The out-of-band management module may further send the fault information to the processor firmware. The processor firmware may isolate, based on the fault information, a row or a bit on which the fault occurs. In the foregoing method, an accurate location of a memory fault can be determined, thereby avoiding a problem that a location of the fault cannot be accurately located during processing of the memory fault, and improving processing precision of the memory fault.

Figure 7:
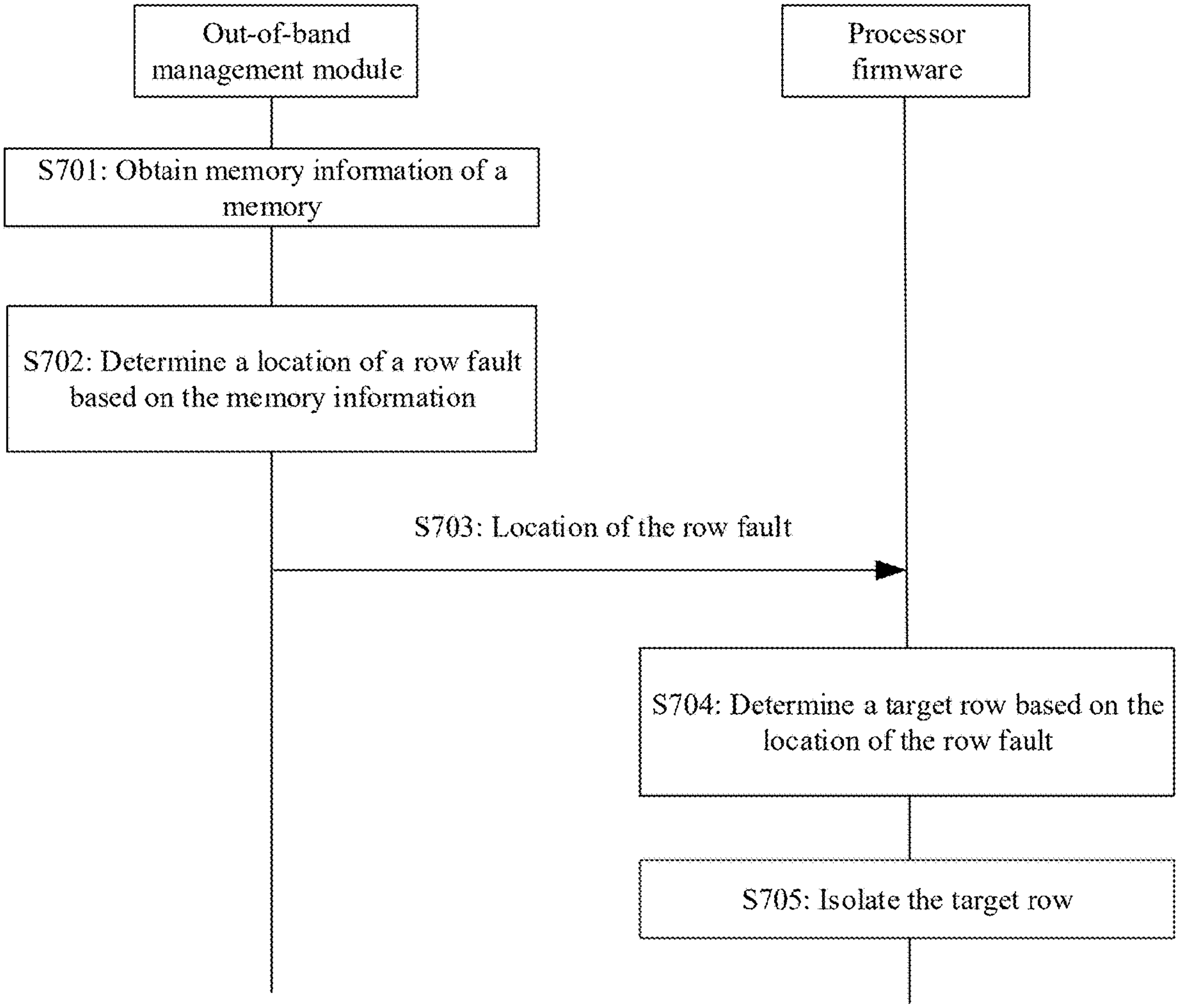
FIG. 7 is a schematic flowchart of a row fault prediction and processing method according to an embodiment of this application.
Figure 8:
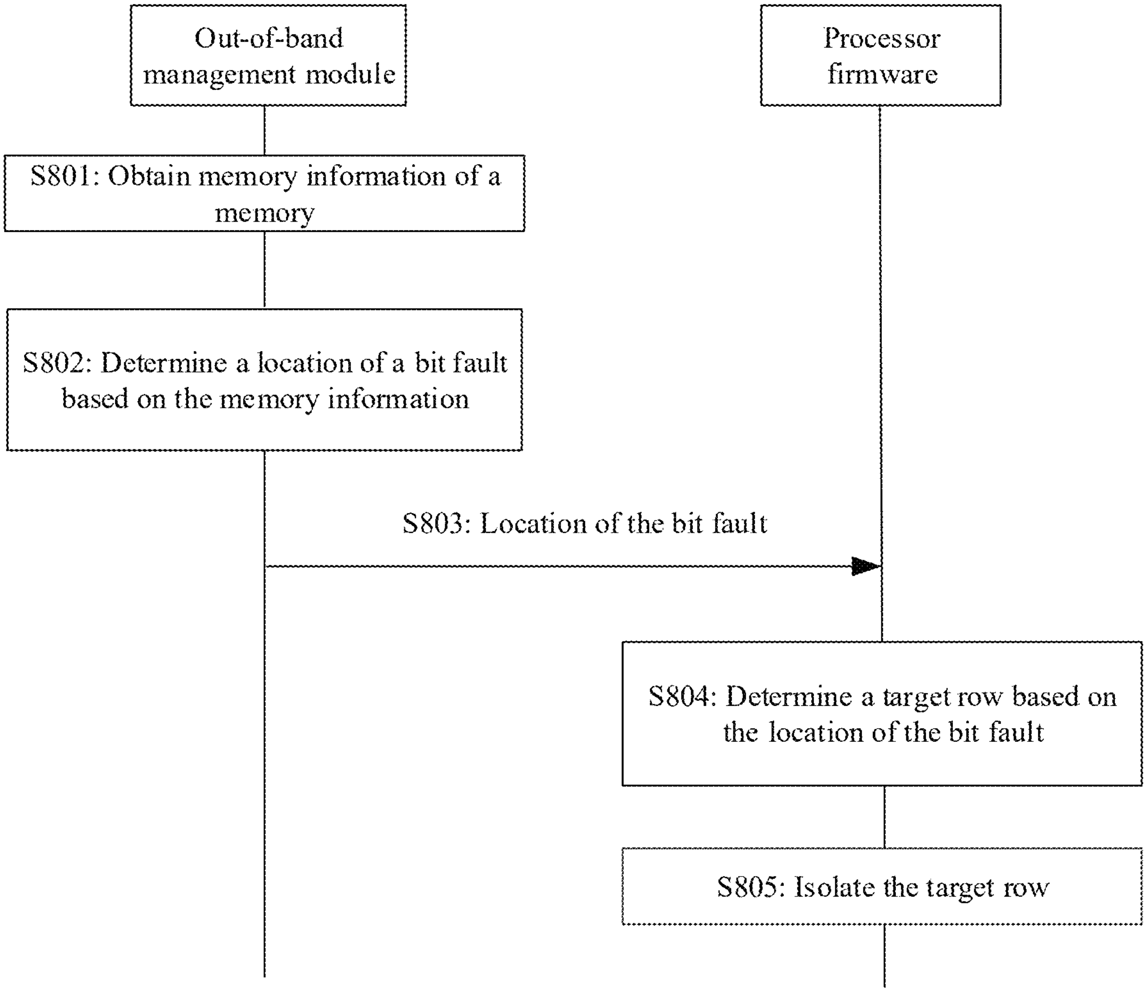
FIG. 8 is a schematic flowchart of a bit fault prediction and processing method according to an embodiment of this application.

Based on the embodiment in FIG. 6, with reference to FIG. 7 and FIG. 8, a row fault prediction and processing method and a bit fault prediction and processing method are separately described.

FIG. 7 is a schematic flowchart of a row fault prediction and processing method according to an embodiment of this application. As shown in FIG. 7, the method may include the following operations.

Operation S701: An out-of-band management module obtains memory information of a memory.

Operation S702: The out-of-band management module determines a location of a row fault based on the memory information.

A specific implementation of S701 and S702 is similar to that of S601 and S602. Details are not described herein again.

Operation S703: The out-of-band management module sends the location of the row fault to processor firmware.

The location of the row fault may include a processor address, a channel address, a memory address, a rank address, a particle address, a bank address, and a row address.

For example, the out-of-band management module may send, to the processor firmware, a processor number, a channel number, a memory number, a rank number, a device number, a bank number, and a row number that are corresponding to a target row.

Operation S704: The processor firmware determines the target row based on the location of the row fault.

For a method used by the processor firmware to determine the target row, refer to S604. Details are not described herein again.

Operation S705: The processor firmware isolates the target row.

In the foregoing method, a location of a memory fault can be accurate to a row address. The processor firmware may isolate the target row based on information about the row fault, thereby avoiding a problem that an isolation location is inaccurate, and improving processing accuracy of the memory fault.

FIG. 8 is a schematic flowchart of a bit fault prediction and processing method according to an embodiment of this application. As shown in FIG. 8, the method may include the following operations.

Operation S801: An out-of-band management module obtains memory information of a memory.

Operation S802: The out-of-band management module determines a location of a bit fault based on the memory information.

A specific implementation of S801 and S802 is similar to that of S601 and S602. Details are not described herein again.

Operation S803: The out-of-band management module sends the location of the bit fault to processor firmware.

The location of the bit fault may include a processor address, a channel address, a memory address, a rank address, a particle address, a bank address, a row address, a column address, and ECC register information.

For example, the out-of-band management module may send, to the processor firmware, a processor number, a channel number, a memory number, a rank number, a particle number, a bank number, a row number, a column address, and ECC register information that are corresponding to a target bit.

Operation S804: The processor firmware determines a target bit based on the location of the bit fault.

For a method used by the processor firmware to determine the target bit, refer to S604. Details are not described herein again.

Operation S805: The processor firmware isolates the target bit.

In the foregoing method, a location of a memory fault can be accurate to a bit address. The processor firmware may isolate the target bit based on information about a bit fault, thereby avoiding a problem that an isolation location is inaccurate, and improving processing accuracy of the memory fault.

Figure 9:
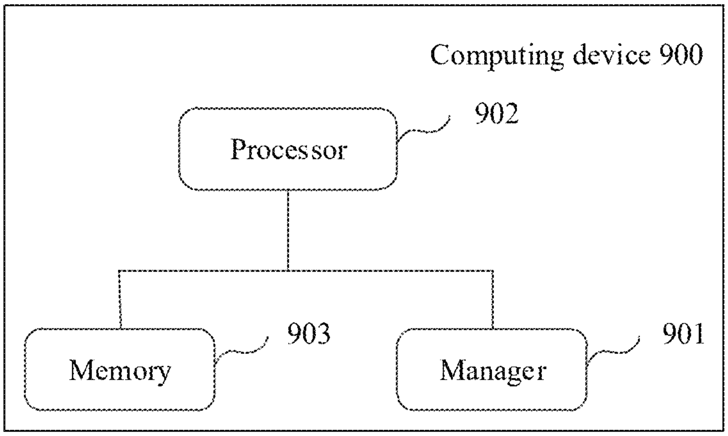
FIG. 9 is a schematic diagram of a structure of a computer device according to an embodiment of this application.

FIG. 9 shows a computing device according to an embodiment of this application. As shown in FIG. 9, a computing device 900 includes one or more managers 901, one or more processors 902, and one or more memories 903. The one or more memories 903 are configured to store computer program code, and the computer program code includes computer instructions. The one or more managers 901 and the one or more processors 902 execute the computer instructions, so that the one or more managers 901 and the one or more processors 902 execute the solutions shown in the foregoing method embodiments.

It should be noted that a structure shown in this embodiment of this application does not constitute a specific limitation on the computing device 900. In other embodiments of this application, the computing device 900 may include more or fewer components than those shown in the figure, combine some components, split some components, or have different component arrangements. The components shown in the figure may be implemented by hardware, software, or a combination of software and hardware. For example, the manager in FIG. 9 may be the out-of-band management module in the foregoing method embodiments, and the processor 902 may be the processor firmware in the foregoing method embodiments.

The computing device provided in this embodiment of this application may execute the solutions shown in the foregoing method embodiments. Implementation principles and beneficial effects of the computing device are similar to those of the solutions, and details are not described herein again.

All or some of the operations of the foregoing method embodiments may be implemented by using hardware related to a program instruction. The foregoing program may be stored in a readable memory. When the program is being executed, the operations in the foregoing method embodiments are performed. The foregoing memory (storage medium) includes a read-only memory (English: read-only memory, ROM for short), a RAM, a flash memory, a hard disk, a solid state disk, a magnetic tape (English: magnetic tape), a floppy disk (English: floppy disk), an optical disc (English: optical disc), and any combination thereof.

Embodiments of this application are described with reference to a flowchart and/or a block diagram of a method, a device (system), and a computer program product according to the embodiments of this application. It should be understood that each process and/or block in the flowchart and/or block diagram and a combination of processes and/or blocks in the flowchart and/or block diagram may be implemented by computer program instructions. These computer program instructions may be provided for a processing unit of a general-purpose computer, a dedicated computer, an embedded processor, or another programmable terminal device to generate a machine, so that instructions executed by a processing unit of a computer or another programmable terminal device generate an apparatus for implementing a function specified in one or more processes in the flowchart and/or one or more blocks in the block diagram.

These computer program instructions may also be stored in a computer-readable memory that can instruct a computer or another programmable terminal device to work in a specific manner, so that instructions stored in the computer readable memory generate an artifact including an instruction apparatus. The instruction apparatus implements a function specified in one or more processes in the flowchart and/or one or more blocks in the block diagram.

These computer program instructions may also be loaded onto a computer or another programmable terminal device, so that a series of operation steps are performed on the computer or the another programmable device to generate computer-implemented processing, and instructions executed on the computer or the another programmable device provide operations for implementing a function specified in one or more processes in the flowchart and/or one or more blocks in the block diagram.

Clearly, a person skilled in the art may make various modifications and variations to the embodiments of this application without departing from the spirit and scope of this application. In this way, if these modifications and variations in the embodiments of this application fall within the scope of the claims of this application and the equivalent technologies thereof, this application also intends to include these modifications and variations.

In this application, the term "including" and a variant thereof may refer to non-limiting inclusion, and the term "or" and a variant thereof may refer to "and/or". In this application, terms "first", "second", and the like are used to distinguish between similar objects, and do not need to be used to describe a specific sequence or order. In this application, "a plurality of" refers to two or more, and "and/or" describes an association relationship between associated objects, and indicates that there may be three relationships, for example, A and/or B may indicate three cases: only A exists, both A and B exist, and only B exists. The character "/" generally indicates an "or" relationship between associated objects.

What is claimed is:

1. A fault processing method, applied to a computing device, wherein the computing device comprises an out-of-band management module and processor firmware, and the method comprises:

obtaining, by the out-of-band management module, memory information of a memory;

determining, by the out-of-band management module, fault information of the memory based on the memory information, wherein the fault information comprises a fault location, and the fault location has an accuracy to a row address of a fault and a bit address of the fault, wherein the bit address identifies a bit within a candidate storage cell based on the row address and a column address;

sending, by the out-of-band management module, the fault information to the processor firmware;

isolating, by the processor firmware, a memory at the fault location based on the fault information.

2. The method according to claim 1, wherein the isolating, by the processor firmware, a memory at the fault location based on the fault information comprises:

when the accuracy of the fault location is at least to the row address of the fault, determining, by the processor firmware, a target row based on the fault location, and isolating a memory in the target row; and when the accuracy of the fault location is at least to a bit address of the fault, determining, by the processor firmware, a target bit based on the fault location, and isolating a memory on the target bit.

3. The method according to claim 1, wherein the fault information further comprises a fault type, and the sending, by the out-of-band management module, the fault information to the processor firmware comprises:

when the fault type is a row fault, sending, by the out-of-band management module, the fault location and a row isolation self-healing request to the processor firmware, wherein the row isolation self-healing request is used to instruct the processor firmware to isolate a memory corresponding to a faulty row; and the isolating, by the processor firmware, a memory at the fault location based on the fault information comprises:

isolating, by the processor firmware, the memory at the fault location based on the row isolation self-healing request.

4. The method according to claim 1, wherein the fault information further comprises a fault type, and the sending, by the out-of-band management module, the fault information to the processor firmware comprises:

when the fault type is a bit fault, sending, by the out-of-band management module, the fault location and a bit isolation self-healing request to the processor firmware, wherein the bit isolation self-healing request is used to instruct the processor firmware to isolate a memory corresponding to a faulty bit; and the isolating, by the processor firmware, a memory at the fault location based on the fault information comprises:

isolating, by the processor firmware, the memory at the fault location based on the bit isolation self-healing request.

5. The method according to claim 1, wherein the fault location comprises a processor address, a channel address, a memory address, a rank address, a particle address, a bank address, a row address, a column address, and error checking and correction register information.

6. The method according to claim 2, wherein the determining, by the processor firmware, a target row based on the fault location comprises:

determining, by the processor firmware, a target bank based on a processor address, a channel address, a memory address, a rank address, a particle address, and a bank address in the fault location; and determining, by the processor firmware as the target row, a row that is in the target bank and that is corresponding to the row address.

7. The method according to claim 3, wherein the determining, by the processor firmware, a target row based on the fault location comprises:

determining, by the processor firmware, a target bank based on a processor address, a channel address, a memory address, a rank address, a particle address, and a bank address in the fault location; and determining, by the processor firmware as the target row, a row that is in the target bank and that is corresponding to the row address.

8. The method according to claim 4, wherein the determining, by the processor firmware, a target row based on the fault location comprises:

determining, by the processor firmware, a target bank based on a processor address, a channel address, a memory address, a rank address, a particle address, and a bank address in the fault location; and determining, by the processor firmware as the target row, a row that is in the target bank and that is corresponding to the row address.

9. The method according to claim 5, wherein the determining, by the processor firmware, a target row based on the fault location comprises:

determining, by the processor firmware, a target bank based on the processor address, the channel address, the memory address, the rank address, the particle address, and the bank address in the fault location; and determining, by the processor firmware as the target row, a row that is in the target bank and that is corresponding to the row address.

10. The method according to claim 2, wherein the determining, by the processor firmware, a target bit based on the fault location comprises:

determining, by the processor firmware, a target bank based on a processor address, a channel address, a memory address, a rank address, a particle address, and a bank address in the fault location;

determining, by the processor firmware, the candidate storage cell from the target bank based on the row address and the column address; and determining, by the processor firmware, the target bit from the candidate storage cell based on error checking and correction register information.

11. The method according to claim 3, wherein the determining, by the processor firmware, a target bit based on the fault location comprises:

determining, by the processor firmware, a target bank based on a processor address, a channel address, a memory address, a rank address, a particle address, and a bank address in the fault location;

determining, by the processor firmware, the candidate storage cell from the target bank based on the row address and the column address; and determining, by the processor firmware, the target bit from the candidate storage cell based on error checking and correction register information.

12. The method according to claim 4, wherein the determining, by the processor firmware, a target bit based on the fault location comprises:

determining, by the processor firmware, a target bank based on a processor address, a channel address, a memory address, a rank address, a particle address, and a bank address in the fault location;

determining, by the processor firmware, the candidate storage cell from the target bank based on the row address and the column address; and determining, by the processor firmware, the target bit from the candidate storage cell based on error checking and correction register information.

13. The method according to claim 5, wherein the determining, by the processor firmware, a target bit based on the fault location comprises:

determining, by the processor firmware, a target bank based on the processor address, the channel address, the memory address, the rank address, the particle address, and the bank address in the fault location;

determining, by the processor firmware, the candidate storage cell from the target bank based on the row address and the column address; and determining, by the processor firmware, the target bit from the candidate storage cell based on the error checking and correction register information.

14. The method according to claim 1, wherein the memory information comprises at least one of the following:

error information of the memory;

running status information of the memory; and device running information of a device on which the memory is located.

15. The method according to claim 1, wherein the determining, by the out-of-band management module, fault information of the memory based on the memory information comprises:

processing, by the out-of-band management module, the memory information by using a machine learning algorithm, to obtain the fault information.

16. The method according to claim 1, wherein the out-of-band management module determines the fault information of the memory information using a machine learning algorithm.

17. A computing device, comprising:

one or more processors; and one or more memories, wherein the one or more memories are configured to store instructions, and the one or more processors execute the instructions to perform operations:

obtaining, by an out-of-band management module of the computing device, memory information of a memory;

determining, by the out-of-band management module, fault information of the memory based on the memory information, wherein the fault information comprises a fault location, and the fault location has an accuracy at least to a row address of a fault and a bit address of the fault, wherein the bit address identifies a bit within a candidate storage cell having the row address and a column address;

sending, by the out-of-band management module, the fault information to a processor firmware; and isolating, by the processor firmware, a memory at the fault location based on the fault information.

18. The computing device according to claim 17, wherein the out-of-band management module determines the fault information of the memory information using a machine learning algorithm.

19. A non-transitory machine-readable medium, wherein the machine-readable medium stores one or more instructions, and when the instructions are executed by a processor, cause a computing device to perform operations:

obtaining, by an out-of-band management module of the computing device, memory information of a memory;

determining, by the out-of-band management module, fault information of the memory based on the memory information, wherein the fault information comprises a fault location, and the fault location has an accuracy at least to a row address of a fault and a bit address of the fault, wherein the bit address identifies a bit within a candidate storage cell having the row address and a column address;

sending, by the out-of-band management module, the fault information to a processor firmware of the computing device; and isolating, by the processor firmware, a memory at the fault location based on the fault information.

20. The non-transitory machine-readable medium according to claim 19, wherein the out-of-band management module determines the fault information of the memory information using a machine learning algorithm.

* * * * *